United States Patent
Proctor et al.

(10) Patent No.: US 6,937,585 B2
(45) Date of Patent: Aug. 30, 2005

(54) TRANSMISSION SCHEME WITHIN A COMMUNICATION SYSTEM

(75) Inventors: Lee Michael Proctor, Cary, IL (US); Mark Hetherington, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 941 days.

(21) Appl. No.: 09/916,564

(22) Filed: Jul. 27, 2001

(65) Prior Publication Data

US 2003/0021248 A1 Jan. 30, 2003

(51) Int. Cl.[7] .............................................. H04J 13/00
(52) U.S. Cl. ...................... 370/335; 370/342; 370/441; 370/442; 370/394; 714/748; 714/749
(58) Field of Search ................. 370/335, 342, 370/320, 441, 442, 465, 389, 216, 241, 394, 351; 714/749, 748

(56) References Cited

U.S. PATENT DOCUMENTS

| | | | | |
|---|---|---|---|---|
| 6,169,732 B1 | * | 1/2001 | Hetherington et al. | 370/335 |
| 6,189,122 B1 | * | 2/2001 | Cheng | 714/748 |
| 6,618,375 B2 | * | 9/2003 | Rezaiifar et al. | 370/394 |
| 6,859,456 B1 | * | 2/2005 | Hetherington et al. | 370/394 |
| 2003/0005382 A1 | * | 1/2003 | Chen et al. | 714/748 |
| 2003/0012212 A1 | * | 1/2003 | Earnshaw et al. | 370/428 |

* cited by examiner

*Primary Examiner*—Wellington Chin
*Assistant Examiner*—Son X. Nguyen

(57) ABSTRACT

To address the need for dispatch in a CDMA communication system, each mobile unit (309, 319) and CBSC (301, 311) involved in a call are allowed to establish an independent RLP session between them. Each session contains its own unique RLP sequence numbers that are not shared. Reverse link sequence numbers are passed from the source CBSC (301, 311) (serving the "talking" mobile) to the target CBSC(s) (301, 311) (serving the "listening" mobiles). However, instead of being directly used by the target CBSC(s) (301, 311) for its forward link RLP sequence number, the sequence numbers passed to the CBSC (301, 311) is translated to the existing target CBSCs (301, 311) current RLP sequence numbers.

12 Claims, 5 Drawing Sheets

TRANSMISSION SCHEME WITHIN A COMMUNICATION SYSTEM

FIELD OF THE INVENTION

The present invention relates generally to communication systems and in particular, to a transmission scheme within a communication system.

BACKGROUND OF THE INVENTION

FIG. 1 is a block diagram of a Code Division Multiple Access (CDMA) communication system as described in U.S. Pat. No. 6,169,732, and incorporated by reference herein. As described in the '732 patent, the data path between Centralized Base Station Controllers (CBSCs) 111 and 112 retains the Radio-Link Protocol (RLP) framing information. RLP initialization/synchronization is established between each mobile (101 and 102) and its CBSC counterpart as for a normal land to mobile or mobile to land calls. After synchronization is established, each RLP maintains the standard negative acknowledgment (NAK) based control messaging between CBSC and mobile, and data frames are forwarded to the target CBSC's Modified RLP (MRLP) and then to the mobile with RLP framing information.

When an erasure occurs on the up-link data path, the frame is Nak'ed by the source CBSC's corresponding MRLP as in a normal call. Subsequent data frames are forwarded to the target CBSC rather than buffered. The target CBSC forwards these frames to the mobile with the expectation (according to standard RLP implementation) that the mobile will NAK the missing frame and buffer subsequent data frames until the missing frame is retransmitted and received. The down-link MRLP will also detect the missing data frame and record this information to determine which NAKs received from the mobile are to be honored (i.e. due to down-link losses) and which have already been Nak'ed by the peer MRLP application (i.e. due to up-link losses). When a NAK frame is received by the up-link MRLP process, it compares the NAK request with the recorded information to determine if the NAK was expected due to a known missing up-link frame or is a new lost frame caused by a down-link erasure.

FIG. 2 illustrates a typical frame erasure scenario using the MRLP approach. In this case, the missing frame is Nak'ed by source CBSC 111 but frames are still forwarded to target CBSC 112 MRLP for transmission to mobile 102. When mobile 102 detects the missing frame, it will NAK the frame to target CBSC 112, however, target CBSC 112 is aware that this frame had already been Nak'ed by source CBSC 111 and is on its way, so target CBSC 112 will ignore this request. The net result is that the frame erasure on the up-link results in only a single frame data hole as seen by mobile 102, which is equivalent to the performance of RLP for land to mobile and mobile to land calls.

Recently it has been proposed to add dispatch capabilities to the CDMA systems. Unlike the interconnect services provided by today's cellular systems, dispatch services have been traditionally provided by two-way radio systems. Such services allow a user to communicate in ways that are difficult or costly using today's cellular systems. The dispatch group call service, for example, enables a user to communicate with a group of people simultaneously and instantaneously, usually just by depressing a push-to-talk (PTT) button. Using a cellular system, such a call could not occur instantaneously since either telephone numbers would need to be dialed for a three-way call or arrangements would need to be made to setup a conference call.

Likewise, the dispatch individual call service enables a user to communicate with another user quickly and spontaneously. This feature is ideal for two people who are working together but are unable to speak with one another directly such as two people working in concert but in different parts of a building. Where a wireless telephone call is more appropriate for a conversation, short messages between two people as they work are better facilitated by the dispatch individual call service.

Traditionally voice services over cellular systems are not used with NAKing protocols due to concerns with the additional speech delays that are incurred due to retransmissions. However, without retransmissions it is important to maintain a low frame erasure rate over the air so as to minimize audio degradation. By allowing retransmissions the frame erasure rate targets can be increased which can result in considerable capacity improvements in a CDMA system. Thus there is a tradeoff of system delay versus system capacity. It has been deemed, for dispatch services, that it is acceptable to introduce a retransmission mechanism (and thus incur some added delay) to improve the number of dispatch calls supported by the system. However, it is still important to minimize system delays where possible. The use of the MRLP mechanism as described in the '732 patent results in considerably less end to end delay than would be incurred if a standard RLP mechanism was used.

For some scenarios the MRLP approach, as described in '732 may be impractical or can be improved upon. For example consider the scenario where two mobiles are already established in a dispatch call and it is desired to move to a group call by adding a third mobile. The original two mobiles have an established RLP session and are on, say, sequence number 100. The third mobile is added and initiates an RLP session with its serving CBSC. RLP sessions are always initiated at sequence number 0 and currently the CDMA IS-95/IS-2000 specifications do not allow for resetting of an RLP session to a non-zero value. When the third mobile is added and MRLP is applied the sequence number received at the mobile will jump from, say, 1 to 100. This could be interpreted by the third mobile in an incorrect manner. For example the mobile could assume that frames 1 through 99 were lost and will request for their retransmission. Alternatively the third mobile could determine that the RLP protocol needs to be aborted and re-initiated. Similar problems could even occur during the establishment of a private (two users) call, particularly if there is a significant time difference between the two mobiles establishing on their respective traffic channels. Because of this, a need exists for a method and apparatus for a transmission scheme within a communication system that utilizes a modified RLP approach to retransmission and allows multiple users to join a call without the need to retransmit large amounts of data.

DETAILED DESCRIPTION OF THE DRAWINGS

Figure 1:
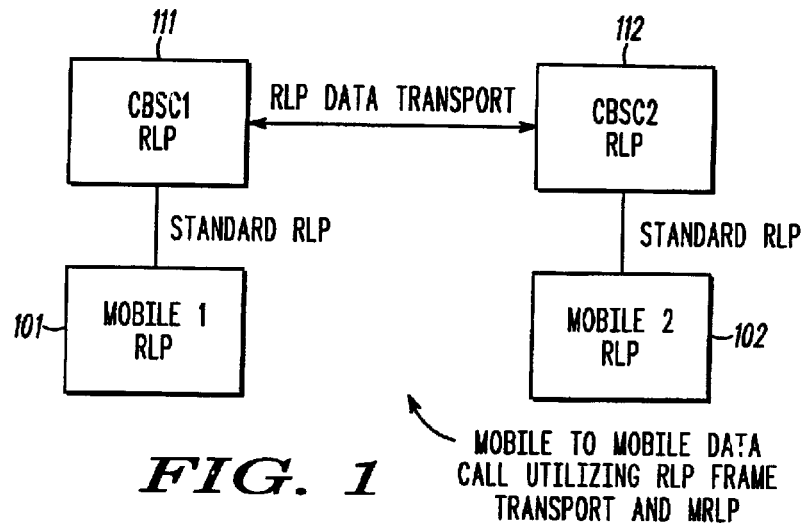
FIG. 1 is a block diagram of a prior-art communication system.
Figure 2:
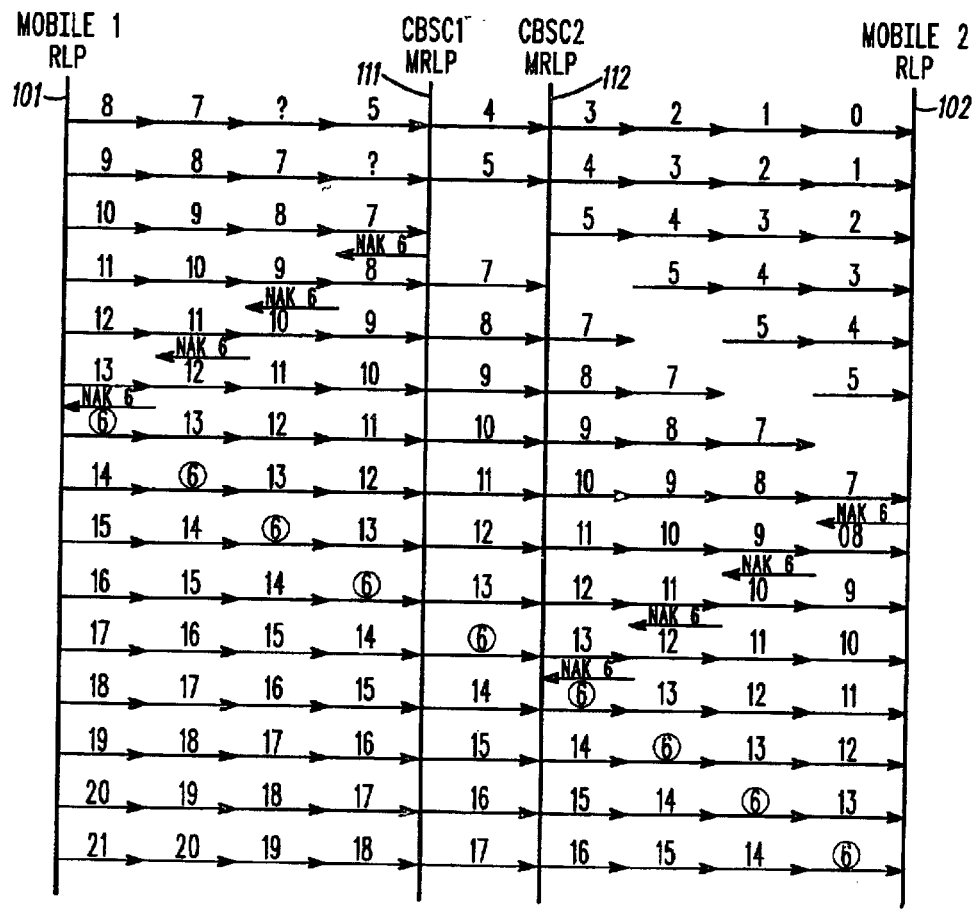
FIG. 2 illustrates a prior-art Modified Radio Link Protocol (MLRP) transmission.

To address the need for dispatch in a CDMA communication system, each mobile unit and CBSC involved in a call are allowed to establish an independent RLP session between them. Each session contains its own unique RLP sequence numbers that are not shared. Reverse link sequence numbers are passed from the source CBSC (serving the "talking" mobile) to the target CBSC(s) (serving the "listening" mobiles). However, instead of being directly used by the target CBSC(s) for its forward link RLP sequence number, the sequence numbers passed to the CBSC is translated to the existing target CBSCs current RLP sequence numbers.

Because each RLP maintains its own unique sequence numbers, mobiles can join, or leave, an existing call without observing, or causing, disruptions in the received RLP sequence numbers. In addition no disruption will occur due to any delay differences between mobiles establishing on the traffic channel will not cause The present invention encompasses a method for data transmission. The method comprises the steps of receiving a frame from a first mobile unit, wherein the frame has a first sequence number corresponding to a first Radio Link Protocol (RLP) session, replacing the first sequence number with a second sequence number, wherein the second sequence number corresponds to a second RLP session, and transmitting the frame with the second sequence number to a second mobile unit, wherein the second mobile unit utilizes the second RLP session.

The present invention additionally encompasses a method for data transmission. The method comprises the steps of receiving a first plurality of frames from a first mobile unit, wherein the first plurality of frames have a first plurality of sequence numbers, and replacing the first plurality of sequence numbers with a second plurality of sequence numbers. The first plurality of sequence numbers are replaced with a third plurality of sequence numbers and the first plurality of frames are transmitted with the second plurality of sequence numbers to a second mobile unit. Finally, the first plurality of frames are transmitted with the third plurality of sequence numbers to a third mobile unit.

The present invention additionally encompasses a method comprising the steps of receiving a plurality of frames having a plurality of sequence numbers associated with the plurality of frames, determining that a frame has been erased due to a skip in the plurality of sequence numbers, and storing an erased-frame sequence number without sending the erased frame to a mobile unit. A negative acknowledgment (NAK) is received in response to the step of not sending the erased frame to the mobile unit and the erased frame is received as well. The erased frame sequence number is translated to a second sequence number and sent to the mobile unit.

The present invention additionally encompasses an apparatus. The apparatus comprises a logic unit having a first frame as an input, the first frame having a first sequence number corresponding to a first Radio Link Protocol (RLP) session, a translation database coupled to the logic unit, the translation database providing a second sequence number corresponding to a second RLP session, and transmission circuitry for transmitting the first frame with the second sequence number to a second mobile unit, wherein the second mobile unit utilizes the second RLP session.

The present invention additionally encompasses an apparatus comprising a logic unit having a first plurality of frames as an input, wherein the first plurality of frames have a first plurality of sequence numbers, the logic unit outputting the first plurality of frames with a second plurality of sequence numbers replacing the first plurality of sequence numbers, a second logic unit having the first plurality of frames as an input, and outputting the first plurality of frames with a third plurality of sequence numbers replacing the first plurality of sequence numbers, first transmission circuitry outputting the first plurality of frames with the second plurality of sequence numbers to a first mobile unit, and second transmission circuitry outputting the first plurality of frames with the third plurality of sequence numbers to a second mobile unit.

Figure 3:
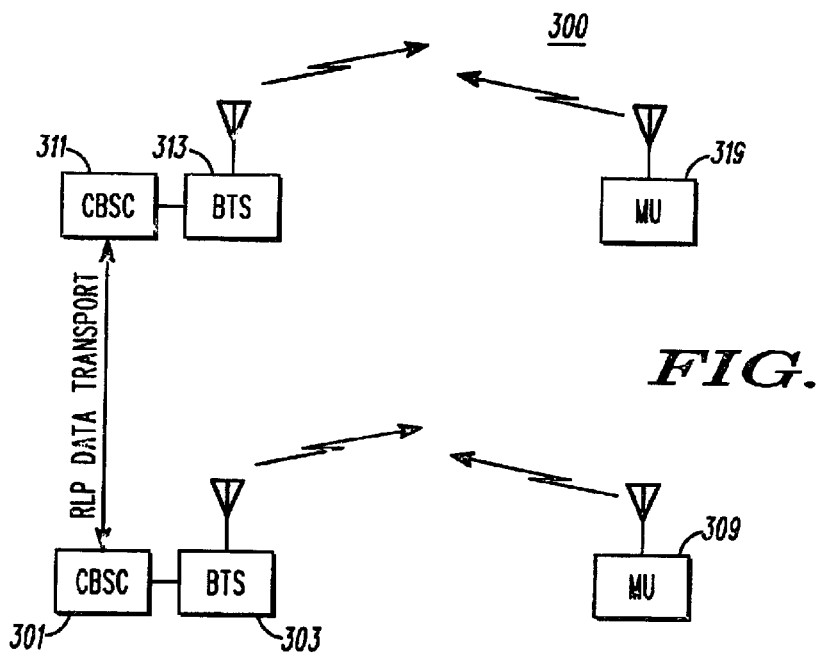
FIG. 3 is a block diagram of a communication system in accordance with the preferred embodiment of the present invention.

Turning now to the drawings, wherein like numerals designate like components, FIG. 3 is a block diagram of communication system 300 in accordance with the preferred embodiment of the present invention. In the preferred embodiment of the present invention, communication system 300 utilizes a Code Division Multiple Access (CDMA) system protocol as described in Cellular System Remote unit-Base Station Compatibility Standard of the Electronic Industry Association/Telecommunications Industry Association Interim Standard 2000 (IS2000), which is incorporated by reference herein. (EIA/TIA can be contacted at 2001 Pennsylvania Ave. NW Washington D.C. 20006). However, in alternate embodiments communication system 300 may utilize other digital cellular communication system protocols such as, but not limited to, the next generation CDMA architecture as described in the UMTS Wideband cdma SMG2 UMTS Physical Layer Expert Group Tdoc SMG2 UMTS-L1 221/98 (UMTS 221/98), the next generation CDMA architecture as described in the cdma2000 International Telecommunication Union-Radiocommunication (ITU-R) Radio Transmission Technology (RTT) Candidate Submission document, or the next generation Global System for Mobile Communications (GSM) protocol, the CDMA system protocol as described in "Personal Station-Base Station Compatibility Requirements for 1.8 to 2.0 GHz Code Division Multiple Access (CDMA) Personal Communication Systems" (American National Standards Institute (ANSI) J-STD-008), or the European Telecommunications Standards Institute (ETSI) Wideband CDMA (W-CDMA) protocol.

In accordance with the preferred embodiment of the present invention communication system 300 is configured so that data paths between CBSCs 301 and 311 retain the RLP framing information and the two CBSCs implement the modified RLP algorithm for both voice and data according to various aspects of the invention. RLP initialization/synchronization is established between each mobile and its CBSC counterpart as for a normal land to mobile or mobile to land calls. After synchronization is established, each RLP maintains the standard negative acknowledgment (NAK) based control messaging between CBSC and mobile, and data frames are forwarded to the peer MRLP and then to the mobile with RLP framing information. When an erasure occurs on the up-link data path, the frame is Nak'ed by the corresponding MRLP at the source CBSC as in a normal call, however, while the up-link MRLP is waiting for frame retransmission, subsequent frames are forwarded to the peer MRLP (target CBSC) rather than buffered. The peer downlink MRLP forwards these frames to the mobile with the expectation (according to standard RLP implementation) that the mobile will NAK the missing frame and buffer subsequent data frames until the missing frame is retransmitted and received. The down-link MRLP will also detect the missing data frame and record this information to determine which NAKs received from the mobile are to be honored (i.e. due to down-link losses) and which have already been Nak'ed by the peer MRLP application (i.e. due to up-link losses). When a NAK frame is received by the up-link MRLP process, it compares the NAK request with the recorded information to determine if the NAK was expected due to a known missing up-link frame or is a new lost frame caused by a down-link erasure.

As discussed above, when dispatch capabilities are added to a CDMA system the MRLP approach to retransmission becomes inefficient. More particularly, because each call involves its own unique RLP sequence numbers, the use of one RLP sequence number (for retransmission purposes) between multiple mobile units involved in a dispatch call is not practical. In order to solve this problem, in the preferred embodiment of the present invention each mobile unit and CBSC involved in a call are allowed to establish an independent RLP session between them. Each session contains its own unique RLP sequence numbers. Reverse link sequence numbers are passed from the source CBSC (serving the "talking" mobile) to the target CBSC(s) (serving the "listening" mobiles) as described in the '732 patent. However, instead of being directly used by the target CBSC(s) for its forward link RLP sequence number, the sequence numbers passed to the CBSC(s) are translated to the existing target CBSCs current RLP sequence numbers.

Figure 4:
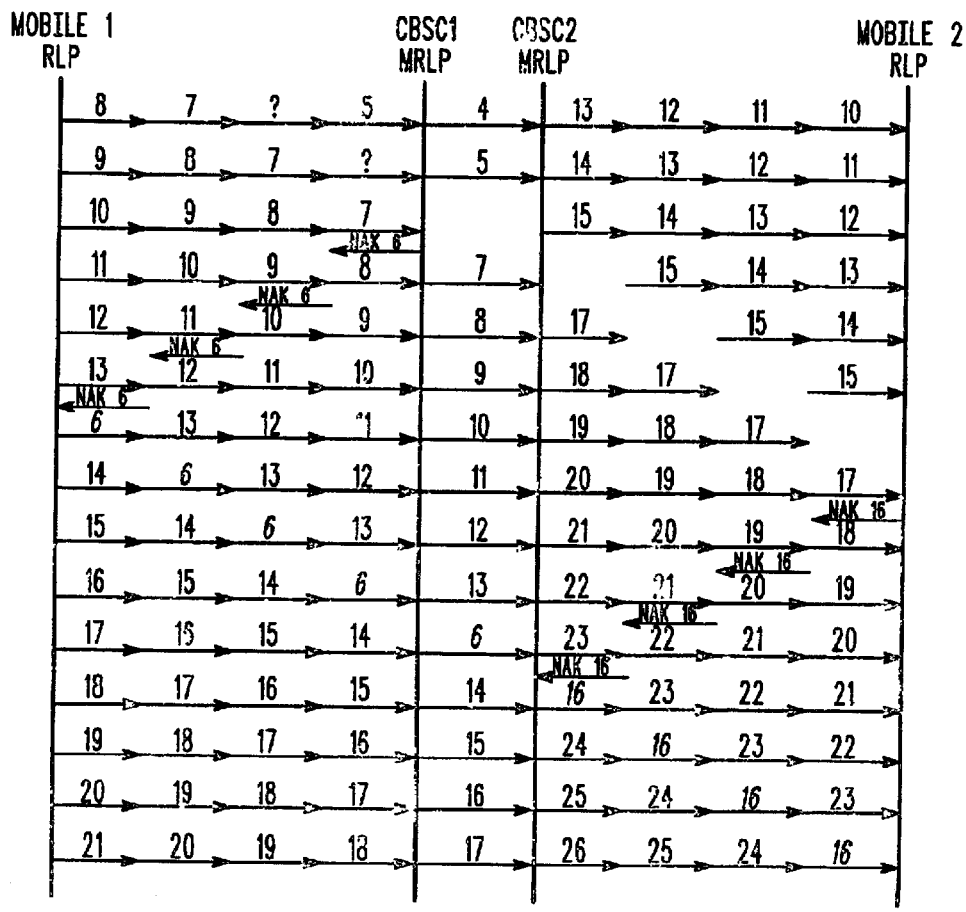
FIG. 4 illustrates a MLRP transmission in accordance with the preferred embodiment of the present invention.

Because unique RLP sequence numbers are maintained for each call leg, an individual user can join an existing conversation without the RLP requesting retransmission of multiple frames. In addition no disruption will occur due to any delay differences between mobiles establishing on the traffic channel will not cause FIG. 4 illustrates a MLRP transmission in accordance with the preferred embodiment of the present invention. As is evident, frames received by source CBSC 301 are immediately forwarded to target CBSC 311 with the received RLP sequence number attached. target CBSC 311 has a separate RLP session with mobile unit 319. Because of this, target CBSC 311 forwards the frames to mobile unit 319, but replaces the received RLP sequence numbers with ones that are appropriate for its own session. When there are no lost frames, the sequence numbers are incremented in step with each other.

When a frame (e.g., frame 6) is lost during transmission over the air between mobile unit 309 and source CBSC 301, source CBSC 301 initiates a retransmission of the lost frame by sending mobile unit 309 a NAK. Meanwhile, frames continue to be forwarded to target CBSC 311 with the RLP sequence numbers attached. target CBSC 311 detects the missing frame due to the skip in sequence number target CBSC 311 stores the frame sequence number in memory and continues transmitting received frames (with translated sequence numbers) to mobile unit 319. This causes a corresponding skip (i.e., frame 16 is skipped) in RLP sequence numbers between mobile 319 and target CBSC 311. Mobile unit 319 immediately sends a NAK associated with the skipped frame 16 to target CBSC 311. target CBSC 311 checks stored frames to determine if a NAK was already sent to source CBSC 301, and waits for frame 6 to arrive. Frame 6 sequence number is then replaced by sequence number 16 and forwarded to mobile unit 319.

In the above embodiment mobile unit 319 can not distinguish between frames erased on the first link (uplink) from frames erased on the second link (downlink) and thus sends NAK for all missing RLP sequence numbers. In an alternative embodiment a "NAK Not Required" field is added to the RLP framing to indicate whether or not a NAK is required. For example, if target CBSC 311 has deliberately skipped the RLP sequence number, due to an erasure on the link between mobile unit 309 and source CBSC 301 (first link), it sets the "NAK Not Required" field. On seeing this field set the mobile 319 determines that the skip in sequence number was not due to a downlink erasure (second link) and that a NAK is not required to be sent to target CBSC 311. This also indicates to mobile 319 to expect the missing frame to arrive in the future.

Figure 5:
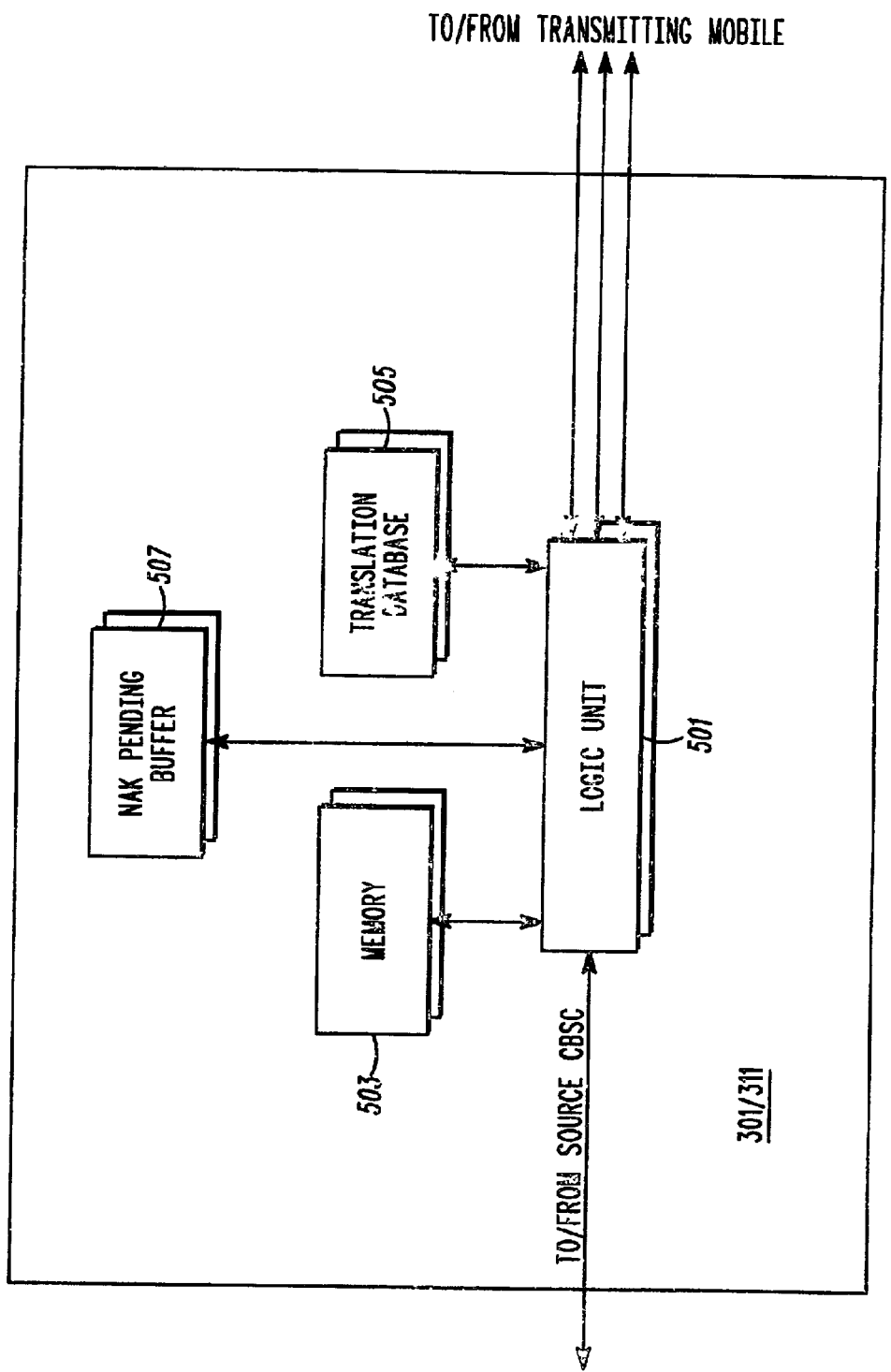
FIG. 5 is a block diagram of a Centralized Base Station Controller (CBSC) in accordance with the preferred embodiment of the present invention.

As discussed above, because each RLP maintains its own unique sequence numbers, mobiles can join, or leave, an existing call without observing, or causing, disruptions in the received RLP sequence numbers. In addition no disruption will occur due to any delay differences between mobiles establishing on the traffic channel will not cause FIG. 5 is a block diagram of a Centralized Base Station Controller (CBSC) in accordance with the preferred embodiment of the present invention. As shown, CBSC 301/311 comprises logic unit 501, memory 503, translation database 505, and NAK pending buffer 507. Logic unit 501 additionally comprises transmission circuitry (not shown) for forwarding RLP frames. In the preferred embodiment of the present invention Source source CBSC 301 forwards good frames and the corresponding (first) RLP sequence numbers to Logic Unit 501. The RLP sequence number is then passed to translation database 505 which serves to provide translation information between RLP sessions. In particular, translation database 505 is responsible for keeping the local RLP session between target CBSC 311 and Mobile Unit 319 in lock step with the remote RLP session between source CBSC 301 and Mobile Unit 309, translation database 505 contains the previous local and far (second) RLP sequence numbers.

On receiving the current far RLP sequence number from Logic Unit 501 translation database 505 determines the offset from the previous far RLP sequence number. This offset is then applied to the previous local RLP sequence number to generate the current local RLP sequence number. Translation database 505 supplies the translated RLP sequence number to logic unit 501 as well as RLP sequence numbers of any frames that it determined to be missing.

Logic unit 501 stores the received frame including the translated RLP sequence number in memory 503 in a position dependent on the translated RLP sequence number. In particular, standard RLP requires the storage of received frame in case the frame is lost on the downlink transmission. When a frame is lost during transmission to mobile unit 319, the mobile unit will NAK the frame, and logic unit 501 will retrieve the frame from memory 503 for retransmission.

Continuing, logic unit 501 also stores all received frames and sequence numbers in memory 503 in case of a subsequent NAK by mobile unit 319. When an erased frame is encountered, logic unit 503 determines the translated RLP sequence numbers of missing frames and writes a "Frame Pending" indication into a sequence number dependent location in memory 503. Logic unit 501 also determines whether the frame is a delayed frame (i.e., one retransmitted by mobile unit 309) by checking the appropriate "Frame Pending" indication in memory 503. If it is not a delayed frame Logic Unit 501 transmits the frame, including the translated (second) RLP sequence number, via transmission circuitry (not shown) to mobile unit 319. If it is a delayed frame the Logic Unit determines whether the delayed frame has already been NAKed by the mobile unit 319 by accessing the NAK Pending Buffer 507. If it has been NAKed the frame is transmitted to the mobile unit and the pending NAK removed from the Buffer 507. If it has not been NAKed the frame is not transmitted at the current time but stored until the appropriate NAK is received. When a NAK frame is received by the local MRLP process, it compares the NAK request with the information recorded in memory 503 to determine if the frame is available for transmission. If the frame is available in memory 503 it is transmitted to mobile unit 319. If the "Frame Pending" indication is set, then the NAK request is queued in the NAK Pending Buffer 507, to await the arrival of the requested frame from the source CBSC 301.

In the preferred embodiment the storage of frames in the memory 503 uses post translated RLP sequence numbers. However, it will be clear to those skilled in the art that the storage of frames in memory 503 could use pre-translated RLP sequence numbers. In this case when logic unit 501 receives a NAK from mobile unit 319 it will need to access translation database 505 to determine the corresponding pre translated RLP sequence number.

In an alternative embodiment of the present invention logic unit 501 receives tagged frames from the Source source CBSC 301. The tagged frames including the RLP sequence number and an indication whether or not the Source source CBSC 301 determined the frame to be an erasure. In the case of a good frame the RLP sequence number will be the one received by the Source source CBSC 301 from the source mobile 101. In the case of an erased frame the RLP sequence number is an interpolated sequence number based on previous and subsequent RLP sequence numbers. CDMA specification IS-707 includes some RLP framing protocols that include a "Retransmission" bit that is used to indicate whether or not the frame is a re-sending of a previously transmitted frame. In the preferred embodiment this bit is set by target CBSC 311 when transmitting a frame to mobile unit 319 that has been delayed due to an erasure between mobile unit 309 and source CBSC 301.

Figure 6:
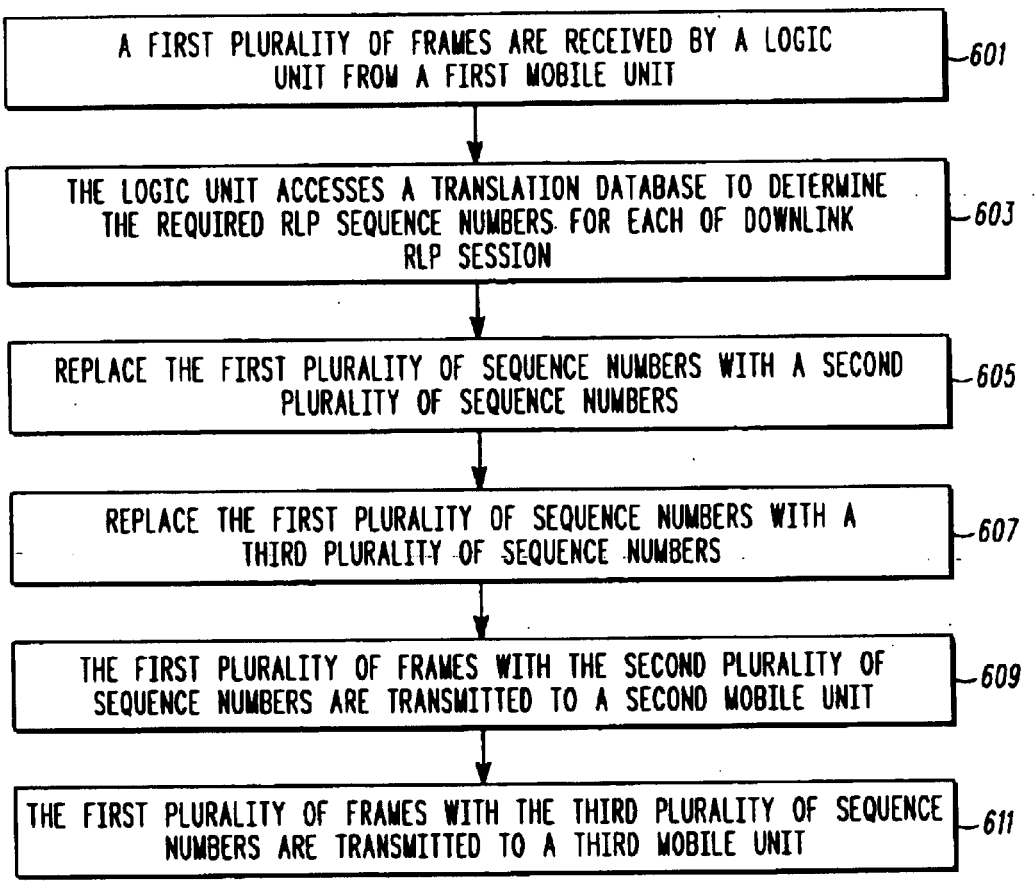
FIG. 6 is a flow chart showing operation of the CBSC of FIG. 5 in accordance with a first embodiment of the present invention.

FIG. 6 is a flow chart showing operation of the CBSC of FIG. 5 in accordance with a first embodiment of the present invention. For simplicity, the following text describes a single receiver, NAK pending buffer, memory, and translator in the target CBSC for the group call case. However, in terms of implementation, each downlink leg (call), whether on the same CBSC or different CBSC would actually have its own frame receiver (logic unit), NAK buffer, database, and translator.

The logic flow begins at step 601 where a first plurality of voice frames are received by logic unit 501 from a first mobile unit. As indicated above, the plurality of frames have first sequence numbers corresponding to a first RLP session. At step 603 logic unit 501 accesses translation database 505 to determine the required RLP sequence numbers for each of downlink RLP session. In particular, the uplink communication received from the transmitting mobile unit may be simultaneously provided to multiple downlink mobile units, each with their own RLP session and independent sequence numbers. This requires the simultaneous translation of the first sequence numbers for each downlink communication. So, for example, where two simultaneous downlink transmissions occur, the first plurality of sequence numbers are replaced with a second plurality of sequence numbers (step 605) and the first plurality of sequence numbers are replaced with a third plurality of sequence numbers (step 607). At step 609 the first plurality of frames with the second plurality of sequence numbers are transmitted to a second mobile unit and finally at step 611, the first plurality of frames with the third plurality of sequence numbers are transmitted to a third mobile unit. As discussed above, in the preferred embodiment of the present invention target CBSC 311 will actually comprise a plurality of logic units, memories, NAK pending databases, and translation databases. Each call leg will utilize its own logic unit, memory, NAK pending database, and translation database.

Figure 7:
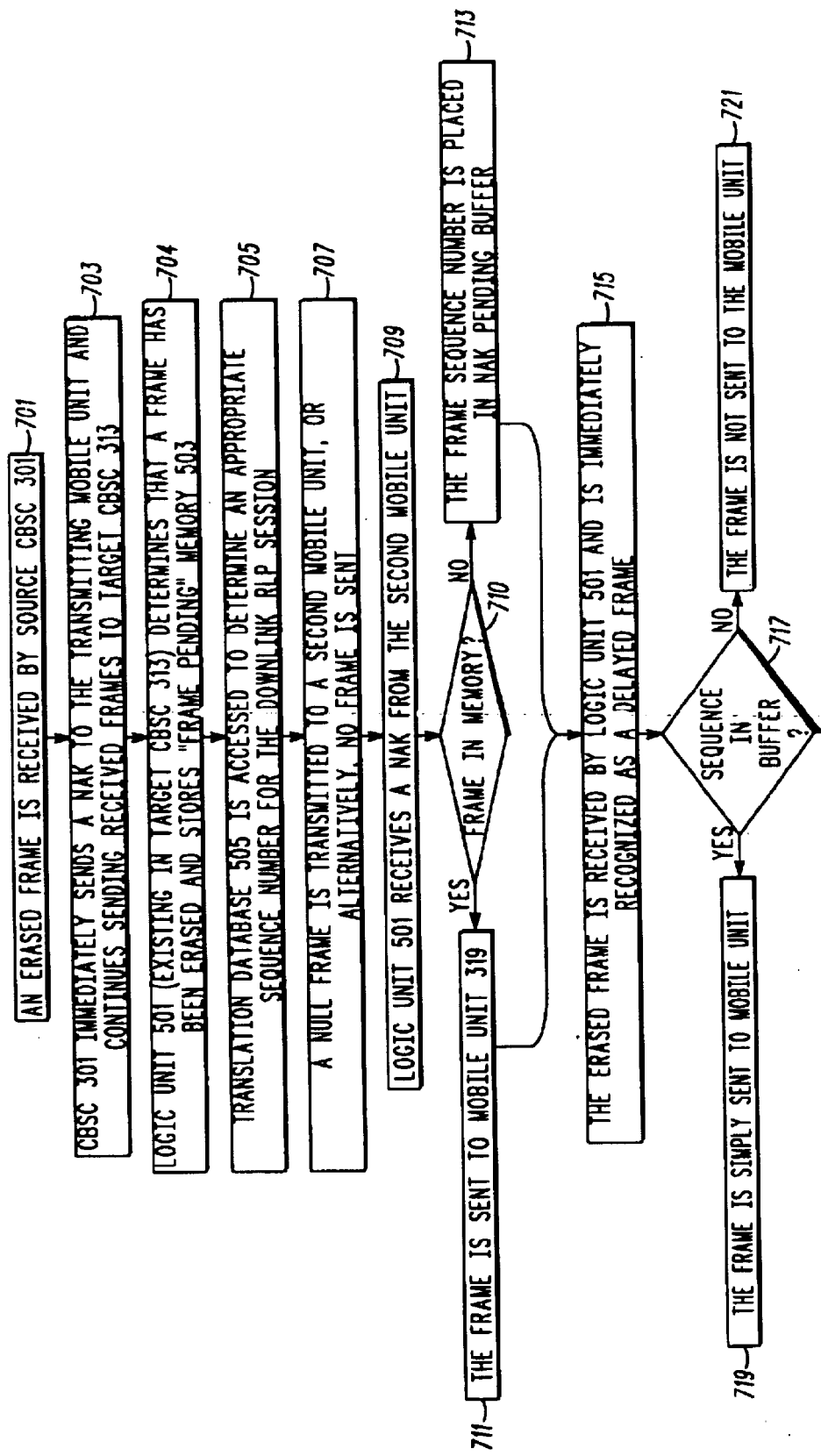
FIG. 7 is a flow chart showing operation of the CBSC of FIG. 5 in accordance with a second embodiment of the present invention.

FIG. 7 is a flow chart showing operation of the CBSC of FIG. 5 during a frame erasure. For simplicity, only one downlink RLP session will be described, although one of ordinary skill in the art will recognize that multiple, simultaneous downlink RLP sessions may be occurring simultaneously. The logic flow begins at step 701 where an erased frame is received by source CBSC 301. As discussed above, source CBSC 301 immediately sends a NAK to the transmitting mobile unit and continues sending received frames to target CBSC 313 (step 703). At step 704 logic unit 501 (existing in target CBSC 313) determines that a frame has been erased and stores "frame pending" along with the sequence number in memory 503. (It should be noted that when a frame is erased, in the preferred embodiment of the present invention no immediate indication of sequence number is received, instead RLP relies on a skip in sequence number to determine that the previous frame was erased).

At step 705 translation database 505 is accessed to determine an appropriate sequence number for the downlink RLP session, and at step 707 a null frame is transmitted to a second mobile unit, or alternatively, no frame is sent. At step 709 logic unit 501 receives a NAK from the second mobile unit and at step 710 it is determined if the frame resides in memory 503. If the frame resides in memory 503, the frame is simply sent to mobile unit 319 (step 711). However, if "frame pending" is stored for that sequence number, then the frame has not yet been received from source CBSC 301. In this case, the frame sequence number is placed in NAK pending buffer 507 (step 713). At step 715 the erased frame is received by logic unit 501 and is immediately recognized as a delayed frame (i.e., one sent out of sequence). The logic flow continues to step 717 where it is determined if the delayed frame sequence number is stored in NAK pending buffer, and if so, the frame is translated and sent to mobile unit 319 (step 719), otherwise the frame is not sent immediately, and stored in buffer 503 (step 721).

No frame is sent when a delayed frame is not existing in NAK pending buffer 507 in order to ensure that the erased frame is not sent twice. In particular, if the delayed frame is received by target CBSC 311 prior to target CBSC 311 receiving a NAK for that frame, the frame will not be sent to the mobile in order to prevent the frame being sent again when the NAK is finally received by the mobile unit.

While the invention has been particularly shown and described with reference to a particular embodiment, it will be understood by those skilled in the art that various changes in form and details may be made therein without departing from the spirit and scope of the invention. For example, instead of the direct forwarding of the received RLP sequence numbers between CBSCs an intermediate sequence number could be used for communication between the CBSCs. In this situation the receiving CBSC translates the received RLP sequence numbers to the intermediate sequence number which is then sent with the frame to the target CBSC. The target CBSC translates the intermediate sequence number to its local RLP sequence number.

Alternatively, timing information can be conveyed between CBSCs rather than an intermediate sequence number. In this case, frames correctly received at a CBSC from a mobile are tagged with an arrival time. These tagged frames are sent to the target CBSC whereas no frames are sent in the case of erasures. The target CBSC is expecting the tagged arrival times to be spaced at approximately the over the air framing interval (in CDMA systems this interval is typically 20 mS). The arrival times are then translated at the target CBSC to the local RLP sequence number. Skips in the tagged arrival times are an indication to the target CBSC to skip RLP sequence numbers. It is intended that such changes come within the scope of the following claims.

What is claimed is:

1. A method for data transmission, the method comprising the steps of:
   receiving a frame from a first mobile unit, wherein the frame has a first sequence number corresponding to a first Radio Link Protocol (RLP) session;
   replacing the first sequence number with a second sequence number, wherein the second sequence number corresponds to a second RLP session; and
   transmitting the frame with the second sequence number to a second mobile unit, wherein the second mobile unit utilizes the second RLP session.

2. The method of claim 1 further comprising the steps of:
   replacing the first sequence number with a third sequence number, wherein the third sequence number corresponds to a third RLP session; and
   transmitting the frame with the third sequence number to a third mobile unit, wherein the third mobile unit utilizes the third RLP session.

3. The method of claim 1 further comprising the steps of:
   determining that there has been an erased frame having a third sequence number;
   failing to send the erased frame to the second mobile unit;
   receiving a negative acknowledgment (NAK) in response to the step of failing to send the erased frame to the second mobile unit;
   accessing a memory to determine if a NAK was previously sent for the erased frame;
   receiving data for the erased frame; and
   sending the data for the erased frame to the second mobile unit with a fourth sequence number.

4. A method for data transmission, the method comprising the steps of:
   receiving a first plurality of frames from a first mobile unit, wherein the first plurality of frames have a first plurality of sequence numbers;
   replacing the first plurality of sequence numbers with a second plurality of sequence numbers;
   replacing the first plurality of sequence numbers with a third plurality of sequence numbers;
   transmitting the first plurality of frames with the second plurality of sequence numbers to a second mobile unit; and
   transmitting the first plurality of frames with the third plurality of sequence numbers to a third mobile unit.

5. The method of claim 4 wherein the step of receiving the first plurality of frames from the first mobile unit comprises the step of receiving the first plurality of frames from the first mobile unit, the first plurality of frames comprising first Radio Link Protocol (RLP) sequence numbers.

6. A method comprising the steps of:
   receiving a plurality of frames having a plurality of sequence numbers associated with the plurality of frames;
   determining that a frame has been erased due to a skip in the plurality of sequence numbers;
   storing an erased-frame sequence number without sending the erased frame to a mobile unit;
   receiving a negative acknowledgment (NAK) in response to the step of not sending the erased frame to the mobile unit;
   receiving the erased frame;
   translating the erased-frame sequence number to a second sequence number; and
   sending the erased frame to the mobile unit with the second sequence number.

7. The method of claim 6 wherein the step of sending the erased frame to the mobile unit with the second sequence number further comprises the steps of:
   receiving the erased frame;
   determining that the erased frame is a delayed frame based on the erased-frame sequence number;
   checking a database to determine of a NAK has been received from the mobile unit; and
   sending the erased frame to the mobile unit with the second sequence number only if a NAK has been received from the mobile unit.

8. The method of claim 7 wherein the step of receiving a plurality of frames having a plurality of sequence numbers comprises the step of receiving a plurality of frames having a plurality of Radio Link Protocol (RLP) sequence numbers.

9. An apparatus comprising:
   a logic unit having a first frame as an input, the first frame having a first sequence number corresponding to a first Radio Link Protocol (RLP) session;
   a translation database coupled to the logic unit, the translation database providing a second sequence number corresponding to a second RLP session; and
   transmission circuitry for transmitting the first frame with the second sequence number to a second mobile unit, wherein the second mobile unit utilizes the second RLP session.

10. The apparatus of claim 9 further comprising:
    a second logic unit having the first frame as an input;
    a second translation database coupled to the second logic unit, the second translation database providing a third sequence number corresponding to a third RLP session; and
    second transmission circuitry for transmitting the first frame with the third sequence number to a third mobile unit, wherein the third mobile unit utilizes the third RLP session.

11. An apparatus comprising:
    a logic unit having a first plurality of frames as an input, wherein the first plurality of frames have a first plurality of sequence numbers, the logic unit outputting the first plurality of frames with a second plurality of sequence numbers replacing the first plurality of sequence numbers;
    a second logic unit having the first plurality of frames as an input, and outputting the first plurality of frames with a third plurality of sequence numbers replacing the first plurality of sequence numbers;
    first transmission circuitry outputting the first plurality of frames with the second plurality of sequence numbers to a first mobile unit; and
    second transmission circuitry outputting the first plurality of frames with the third plurality of sequence numbers to a second mobile unit.

12. The apparatus of claim 11 wherein the first, the second, and the third sequence numbers are first, second, and third Radio Link Protocol (RLP) sequence numbers.

* * * * *